United States Patent [19]

Kuehn

[11] 4,363,490

[45] Dec. 14, 1982

[54] CROWN ROLL SEAL ARRANGEMENT SEALED BY LUBRICATING OIL IN LABYRINTH

[75] Inventor: Howard E. Kuehn, Orange, Conn.

[73] Assignee: USM Corporation, Farmington, Conn.

[21] Appl. No.: 190,946

[22] Filed: Sep. 26, 1980

[51] Int. Cl.³ .............................................. F16J 15/40
[52] U.S. Cl. ........................................ 277/15; 277/17; 277/56; 277/72 FM; 277/135; 308/20; 308/187.1
[58] Field of Search ...................... 277/13, 14 R, 14 V, 277/17, 15, 53–57, 59, 72 R, 72 FM, 135; 308/20, 36.1, 109, 187.1, 117, 187.2, 123, 126

[56] References Cited

U.S. PATENT DOCUMENTS

| | | | |
|---|---|---|---|
| 1,966,923 | 7/1934 | Couch | 277/13 X |
| 2,245,281 | 6/1941 | Klopak | 277/56 |
| 2,641,515 | 6/1953 | Bankauf et al. | 277/56 X |
| 3,429,624 | 2/1969 | Freshwater et al. | 308/84 |
| 3,512,853 | 5/1970 | Petros | 308/36.1 |
| 3,552,809 | 1/1971 | Owens | 277/56 X |
| 3,563,344 | 2/1971 | Veller et al. | 308/133 X |
| 3,628,837 | 12/1971 | Otto | 308/187 |
| 3,805,919 | 4/1974 | Nakamura et al. | 308/187.1 X |
| 3,889,489 | 6/1975 | Casey et al. | 308/187 X |
| 3,893,674 | 7/1975 | Paradine | 308/36.1 X |
| 3,934,948 | 1/1976 | Pruvot | 308/36.1 X |
| 3,934,952 | 1/1976 | Gardner | 308/36.1 |
| 3,940,191 | 2/1976 | Tomioka et al. | 308/187 |
| 4,093,324 | 6/1978 | Carrigan | 277/57 X |
| 4,101,180 | 7/1978 | Anderson et al. | 308/20 |
| 4,103,903 | 8/1978 | Capriotti et al. | 308/187.1 X |
| 4,277,114 | 7/1981 | Lindegger | 277/56 X |

FOREIGN PATENT DOCUMENTS 832676  4/1960  United Kingdom .................. 277/53

*Primary Examiner*—Robert S. Ward, Jr.
*Attorney, Agent, or Firm*—Vincent A. White

[57] ABSTRACT

A non-contact seal for the ends of a variable crown calender roll shaft subject to variations in shaft alignment. The seal is a labyrinthian type with a suction system adapted to a sump to recycle the oil. The oil level is maintained and contact between the rotating shaft and the labyrinthian seal is avoided, permitting higher temperature and higher speed use of the roll apparatus.

5 Claims, 1 Drawing Figure

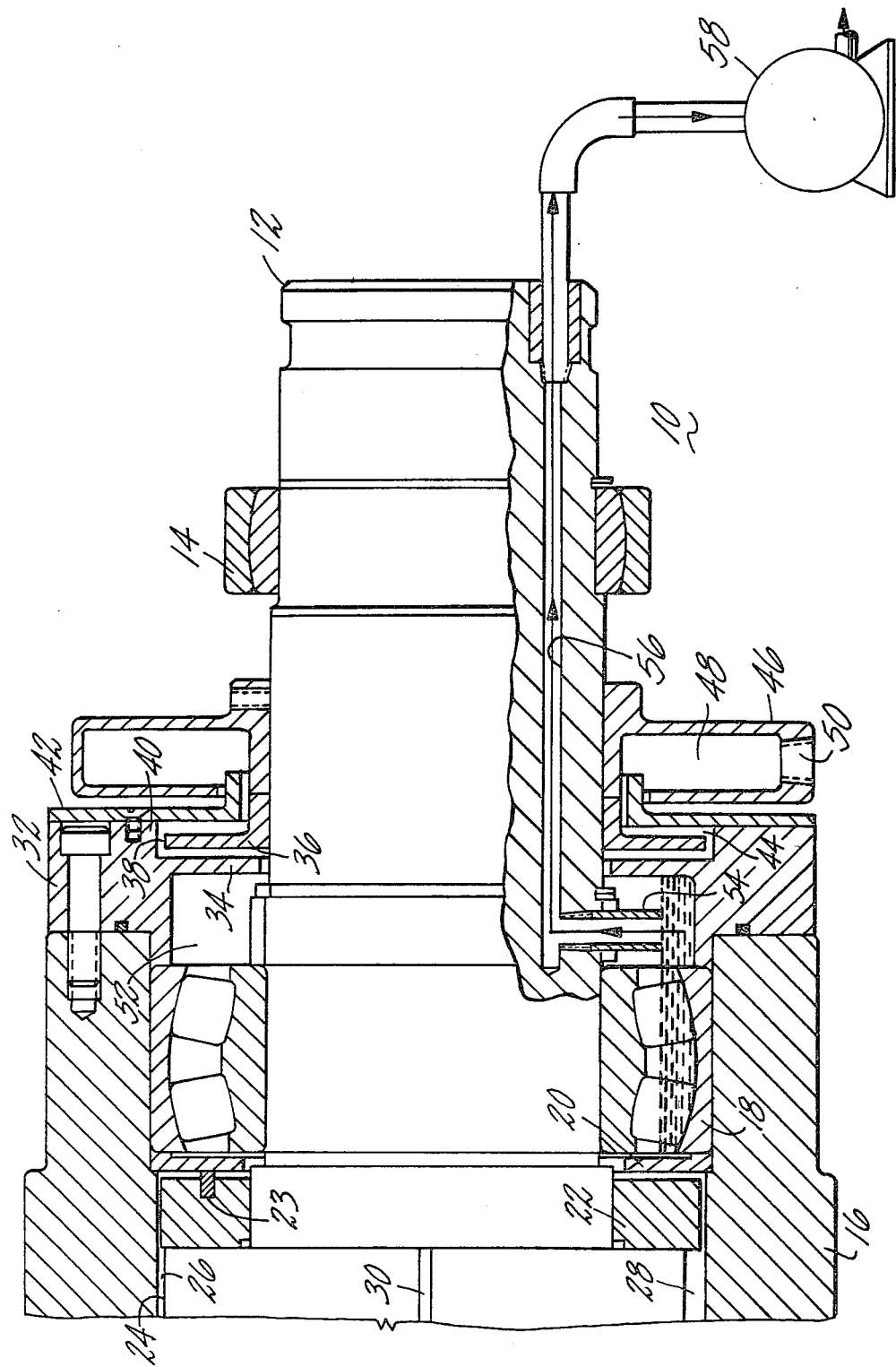

CROWN ROLL SEAL ARRANGEMENT SEALED BY LUBRICATING OIL IN LABYRINTH

BACKGROUND OF THE INVENTION (1) Field of the Invention

This invention relates to roll machinery, and more particularly to lubrication systems for bearings on the roll machinery.

(2) Prior Art

Calender roll machines are utilized in the paper manufacturing industry, among many others. The calender roll machines are more efficient if they are permitted to run faster, and the rolls produce a higher degree of smoothness and gloss to the paper if the rolls are maintained at a high temperature.

The rolls themselves on these calender roll machines comprise an outer rotating shell which is journalled onto a stationary inner shaft on bearings at the ends of the shell. There is an annular space between the shell and the inner shaft. The annular space may be divided into an upper and a lower chamber by full length axial seals arranged between the both sides of the shaft and the inside of the shell. This configuration of axial seals establishes the two longitudinally arranged chambers, an upper chamber and a lower chamber, the upper chamber being pressurizable.

Oil is introduced into the pressurized chamber through an inlet port in the shaft. The oil causes an upward deflection in the middle of the shell with respect to the stationary shaft, which is deflected downwardly at its mid-point, the rotating shell virtually floating on oil. The amount of pressurization determines the amount of deflection of the shell and its internal shaft with respect to one another. This seal arrangement is also applicable for use with pressurizable piston-cylinder deflection control apparatus as well.

During operation of most embodiments of the roll machine, oil may pass by the axial and end seals into the non-pressurized chamber providing lubrication for other internal parts, and it flows into the anti-friction bearing areas. In the prior art, the space between the bearings and the end cover of the shell includes contact seals which rub against the shaft as the shell turns therearound to prevent loss of oil. The speed of rotation thusly has a detrimental effect on the contact seals because it tends to heat the contact seals and to harden them. This in combination with the varying degrees of deflection between the shaft and the shell tends to destroy the seals, and by using contact seals, it limits the temperatures at which the rolls may be run, it limits the speed they may be run and it effects their ability to fully counter-deflect themselves.

Thus, it is an object of the present invention to provide a seal arrangement on a deflectable roll that will extend the operating temperature, speed and life of those rolls.

BRIEF SUMMARY OF THE INVENTION

The present invention comprises a labyrinthian seal arrangement adjacent an annular bearing between a rotatable shell and a stationary inner shaft. The labyrinthian seal has a drain plug thereadjacent and has suction in a chamber adjacent the bearing; to maintain the oil in the bearings at a proper level to prevent leakage through the labyrinthian seal which prevents contamination of the bearing assembly because of the elimination of the short-lived contact seal. The annular bearing comprises a bearing arrangement disposed at each end of the roll shell between the inside thereof, and the stationary inner shaft. The annular space between the inner shaft and the roll shell may be divided generally horizontally into two curvilinear longitudinally directed chambers, one upper and one lower. The upper chamber is pressurized with oil to deflect upwardly the outer roll shell to counter the effects of loading thereon. The stationary shaft is deflected downwardly as it picks up the load of the outer shell. Some of the pressurized oil whether in the double chamber embodiment or the piston cylinder embodiment is allowed to escape to lubricate the bearings and the like. The oil is maintained in a chamber in communication with and adjacent the bearings at a particular level so as to assure lubrication of the bearings, because the seal at the end cap is of non-contact, non-wear type of labyrinthian seal which does not self destruct due to heat and the deflection of the outer shell and the inner shaft as do the prior art seals. The particular level of oil is maintained by a suction line from a suction pump through an inner shaft and into the oil pool. The oil is recycled through the pump and pressurized chamber during its operative cycle. Thus the non-contact labyrinthian seal arrangement when utilized with a suction unit to recycle the oil provides an effective apparatus to minimize any loss of lubricating oil and to minimize entrance into the roll apparatus by an external contaminants.

BRIEF DESCRIPTION OF THE DRAWINGS

The objects and advantages of the present invention will become more apparent when viewed in conjunction with the drawing which is a side elevational view of one end of a variable crown roll seal arrangement constructed according to the principles of the present invention.

DESCRIPTION OF THE PREFERRED EMBODIMENT

Referring now to the drawing in detail, there is shown one end of a variable crown roll 10. The crown roll 10 comprises a stationary roll shaft 12 having a support bearing 14 thereon, which is adaptable for support in a frame of a calender roll machine, not shown. A cylindrically shaped roll shell 16 is rotatively disposed about the roll shaft 12 and is supported at each end thereof, by a bearing 18 arranged therebetween. An end seal ring 20 is disposed in annular engagement with the inner surface of the roll shell 16 adjacent the inner side of the roller bearing 18, and an end seal support ring 22 is arranged on the roll shaft 12 adjacent the inner side of the end seal ring 20. There is a slight clearance between the inner surface of the roll shell 16 and the periphery of the end seal support ring 22, there is a slight annular clearance between the inner periphery of the end seal ring 20 and the roll shaft 12 and there is also a side seal 23 arranged between the end seal support ring 22 and the end seal ring 20. There is an annular space 24 disposed between the roll shaft 12 and the inner surface of the roll shell 16 which may be longitudinally divided into a curvilinear upper chamber 26 and a curvilinear lower chamber 28 by an arrangement of axial seals 30, spaced between the roll shell 16 and on both sides of the roll shaft 12.

A labyrinthian seal support 32 is attached to each end of the roll shell 16 and has a generally radially inwardly projecting annular flange 34, the inner periphery of which, is spaced from the roll shaft 12. A radially outwardly projecting flange 36 is attached to the roll shaft 12 spaced axially from the inwardly projecting annular flange 34, and has a radial space 38 between the outer periphery of the flange 36 and a shoulder 40 of the labyrinthian seal support 32. A ring 42 is attached to the shoulder 40 of the labyrinthian seal support 32 and is axially spaced from the axially outward side of the radially projecting flange 36, to define further a labyrinthian passageway 44 to an end cap 46 which itself defines an annular chamber 48 having a drain 50 at its lowermost portion thereof. The end cap 46 is attached to the roll shaft and comprises the end of the labyrinthian seal.

An annular chamber 52, is shown disposed between the roll shaft 12 and the roll shell 16, and between the outer axial side of the bearing 18 and the inner axial side of the radially inwardly projecting annular flange 34, wherein oil may collect after it has passed through the bearing 18. A drain pipe 54 is disposed into the lowermost portion of the annular chamber 52 and it extends therein to a particular level which is the desired height of oil therein arranged to prevent overflow of oil through the labyrinthian seal. The drain pipe 54 is connected to a conduit 56 arranged axially within the roll shaft 12. The conduit 56 is in fluid communication with a suction pump 58. The suction pump 58 is in fluid communication with a tank, not shown, which comprises the supply source for the recycled oil used in the deflection of the variable crown roll 10.

During operation of the calender roll machine, oil is supplied under pressure by proper fluid pumping means, not shown, to the upper chamber 26. The pressurized oil effects an upward deflection in the roll shell 16 to counter any loads that may be acting hereagainst. The roll shaft 12 is caused to deflect downwardly to bear the load on the roll shell 16. Some of the pressurized oil passes the axial seals 30 and is also allowed to pass around the outer surface of the end seal supporting ring 22 and by the side seal 23 and the clearance between the end seal ring 20 and the roll shaft 12 to lubricate the bearing 18. The oil collects in the lowermost portion of the annular chamber 52, and is maintained at a desired level thereat by action of the suction pump 58 being in fluid communication through the conduit 56 and the drain pipe 54, thus maintaining proper lubrication for the bearing while preventing overflow of excess oil through the non-contact labyrinthian passageway 44 which prevents dirt and contamination from entering the bearing.

It is to be noted that the deflection of the roll shell 16 with respect to the roll shaft 12 may be accomplished by means such as pressurizable piston-cylinder units, not shown, arranged therebetween, wherein similar oil passage would still be desired. Thus there has been shown an effective lubrication system for bearings in a variable crown roll, wherein the bearing lubrication level is maintained, while effectively substituting seals of a non-contact type which are particularly suited for members that are deflected frequently, and are subject to temperatures in excess of 500° F. that would otherwise shorten the life span of the seals of the prior art.

I claim:

1. A seal arrangement for a calender roll comprising:
   a stationary roll shaft;
   a roll shell rotatively journalled in a bearing at each end about said roll shaft;
   a fluid passageway for permitting said bearings to receive lubricating fluid from a lubricating chamber;
   a labyrinthian non-contact seal arranged on the outer side of said bearings on said shaft between said shaft and said roll shell; and
   a fluid discharge system for maintaining a predetermined level of lubricating fluid about said bearings in said chamber and preventing passage of excess fluid through said labyrinthian seal.

2. A seal arrangement for a calender roll as recited in claim 1, wherein said labyrinthian seal comprises at least one radially directed flange spaced between said roll shaft and said roll shell.

3. A seal arrangement for a calender roll as recited in claim 1, wherein said fluid discharge system comprises a suction pipe arranged near said bearing and disposed at a particular level to withdraw lubricating fluid thereabove.

4. A seal arrangement for a calender roll as recited in claim 3, wherein said fluid discharge system comprises a conduit which is in fluid communication with said suction pipe and a suction pump, wherein said lubricating fluid may be recycled to eventually flow through said bearings repeatedly.

5. A seal arrangement for a calender roll as recited in claim 3, including an end cap comprising a portion of said labyrinthian seal, wherein said end cap has a drain plug at its lowermost portion to facilitate discharge of any excess lubricating fluid which may have traversed said labyrinthian seal.

* * * * *